June 9, 1925.   1,541,329
E. W. DAVIS
COUPLING
Filed Feb. 14, 1921
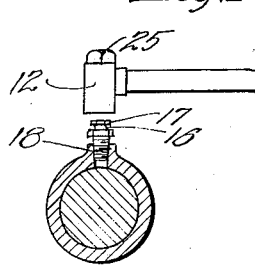
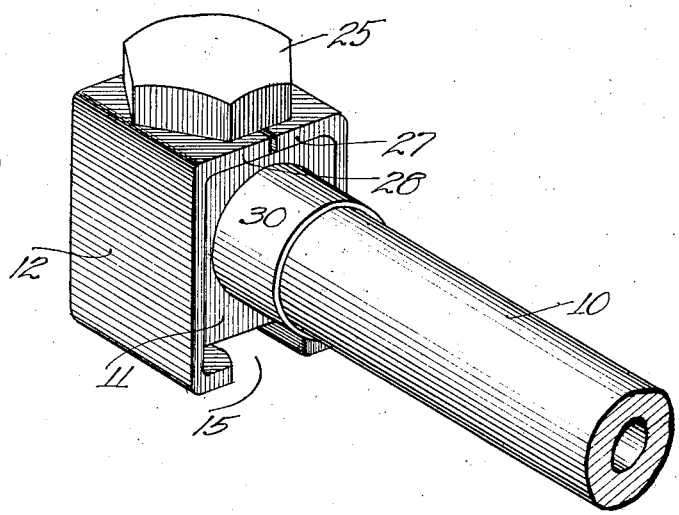
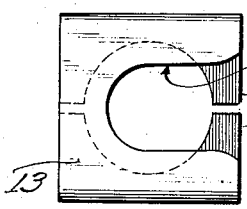
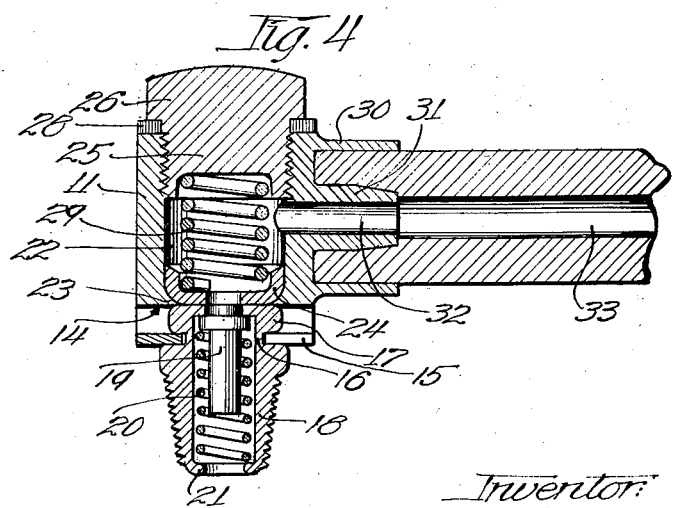
Inventor:
Ernest W. Davis Patented June 9, 1925.

1,541,329

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

COUPLING.

Application filed February 14, 1921. Serial No. 444,932.

*To all whom it may concern:*

Be it known that I, ERNEST W. DAVIS, a citizen of the United States, and resident of Oak Park, in the county of Cook and State of Illinois, have invented a certain new and useful Improvement in Couplings (Case 6), of which the following is a full, clear, concise, and exact description, reference being had to the accompanying drawings, forming a part of this specification.

My invention relates to improvements in couplings, and is particularly concerned with improvements in couplings designed for detachably connecting a lubricant compressor with lubricant receiving devices or nipples.

The objects of my invention are:

First, to provide a coupling of such construction that it can be easily and quickly attached to and detached from the lubricant receiving nipples;

Second, to provide a coupling of the character described which can be attached to and detached from the lubricant receiving nipples by movements substantially parallel with the discharge conduit;

Third, to provide a coupling of the character described which is locked to the lubricant receiving nipples, and sealed by the pressure exerted upon the lubricant;

And finally, to provide a coupling which is simple in construction, rugged, and economical to manufacture.

Other objects of my invention will appear as this description progresses, reference being had to the accompanying drawings, in which—

Figure 1 is a side elevation of my improved coupling, showing it in use for connecting a lubricant compressor with a nipple attached to a bearing to be lubricated;

Figure 2 is a perspective view;

Figure 3 is a bottom view of a part of the coupling; and

Figure 4 is a central longitudinal section.

Referring to the drawings, reference character 5 indicates the barrel of a lubricant compressor through one end 6 of which extends a threaded piston rod 7, upon the inner end of which is mounted a plunger 8. The outer end of the rod 7 is provided with a handle 9, by means of which it can be rotated to move the plunger 8 inwardly and subject the lubricant to pressure. A discharge conduit 10, preferably formed of flexible metallic conduit, has one end secured to the barrel 5.

The other end of the conduit 10 is provided with my improved coupling, which comprises a body member 11 which is rectangular in cross-section transversely of the axis of the conduit 10. A metal strap 12 is bent around the four sides of the body member and has a portion 13 which is held in spaced parallel relation with the side 14 of the body member. A notch or opening 15 is formed in one side of the portion 13 for receiving the neck 16 of a headed lubricant receptacle such as shown in Figure 4, which comprises a head 17 secured to the externally screw-threaded tubular portion 18 by the neck 16. The head 17 is provided with an opening which is normally closed by a valve 19 of suitable construction, which is held in its closed position by a compression spring 20, the inner end of which seats against the internal flange 21 at the inner end of the tubular member 18.

The body member is provided with a bore 22 which opens thru the side 14 in registry with the opening or notch 15 in the strap 12. The walls of the bore 22 at the end thereof adjacent the opening 15 are provided with an inwardly extending flange 23 which forms a seat for the centrally apertured cup leather or gasket 24.

A threaded plug 25 is screwed into the opposite end of the bore 22, and has a head provided with an overhanging flange 26, which serves to clamp the opposed ends 27 and 28 of the strap 12 to the adjacent face of the body member. It will of course be understood that the opposed ends of the strap are cut away to conform to the plug.

A compression spring 29 extending between the gasket 24 and the plug 25 provides means for yieldingly holding the gasket on the seat formed by the flange 23, and for establishing an initial seal between it and the head of the nipple.

The free end of the conduit 10 is soldered or otherwise secured to the annular flange 30, and the boss 31, which extend from one face of the body member in concentric relation. The boss 31 is provided with a bore 32 for establishing communication with the bore 33 of the flexible conduit.

All that is necessary for connecting the compressor to a nipple, where the discharge conduit of the compressor is provided with my improved coupling, is to bring the opening 15 into registry with the neck 16 of the nipple, and to then pull upon the conduit, whereupon the coupling moves to a position relative to the nipple shown in Figure 4. The spring 29 maintains an inner contact between the gasket and the head 17 of the nipple. When the compressor is operated to exert pressure upon the lubricant, this increase in pressure upon the rear side of the gasket will cause it to seal that much tighter against the head 17, and at the same time lock the coupling member to the nipple. Upon removing the pressure from the lubricant, the coupling member can be readily detached from the nipple by reversing the operations described above.

While I have described the details of the preferred embodiment of my invention, I wish it to be clearly understood that my invention is not limited to these details, but is capable of further modifications and adaptations within the scope of the appended claims.

Having thus described my invention, what I claim is new and desire to secure by United States Letters Patent is:

1. A coupling comprising a body member, a metal strap bent around said body member, one portion of said strap extending in adjacent parallel relation to the side of said body member and having a notch cut in one edge thereof for receiving the neck of a lubricant receiving nipple, the ends of said strap lying in opposed relation against the opposite side of said body member, said body member having a bore extending therethrough, one end of which registers with said notch, the walls of said bore at the last mentioned end having an inwardly extending flange, a perforated gasket seating on said flange, a plug threaded into the opposite end of said bore and having an overhanging head for clamping the opposed ends of said strap to said body member, and a spring interposed between said plug and said gasket.

2. A coupling comprising a body member, a metal strap bent around said body member, one portion of said strap extending in adjacent relation to the side of said body member and having an opening formed therein for receiving a lubricant receiving nipple, the ends of said strap lying in opposed relation against the opposite side of said body member, said body member having a bore extending therethrough, one end of which registers with said opening, the walls of said bore at the last mentioned end having an inwardly extending flange, a perforated gasket seating on said flange, and a plug threaded into the opposite end of said bore and having an overhanging head for clamping the opposed ends of said strap to said body member.

3. A coupling comprising a body member, a metal strap bent around said body member, one portion of said strap extending in adjacent relation to the side of said body member and having an opening extending in from the edge thereof for receiving a lubricant receiving nipple, said body member having a bore extending therethrough, one end of which registers with said opening, the walls of said bore at the last mentioned end having an inwardly extending flange, a perforated gasket seating on said flange, and a plug threaded into the opposite end of said bore.

4. A coupling comprising a body member, a metal strap secured to said body member in spaced relation to one side thereof, and provided with an opening intermediate its ends for receiving a lubricant receiving member, a bore in said body member one end of which opens in registry with the opening in said strap, and an apertured gasket in said bore for making sealed contact with a nipple received in the opening of said strap.

In witness whereof, I hereunto subscribe my name this 27th day of January, 1921.

ERNEST W. DAVIS.

Witnesses:
EDNA V. GUSTAFSON,
E. J. BOURGEOIS.